Oct. 29, 1963   G. D. HUNTER   3,108,642
CONTROL SYSTEM
Filed Dec. 4, 1961

INVENTOR.
GEORGE D. HUNTER
BY
AGENT

United States Patent Office 3,108,642
Patented Oct. 29, 1963

3,108,642
CONTROL SYSTEM
George D. Hunter, Des Moines, Iowa., assignor to Deere & Company, Moline, Ill., a corporation of Delaware
Filed Dec. 4, 1961, Ser. No. 156,576
7 Claims. (Cl. 172—44)

The present invention relates generally to control systems and more particularly to control systems for agricultural implements such as tool carriers having rod weeder attachments or the like.

The object and general nature of the present invention is the provision of an apparatus in which new and improved means are used for controlling various elements of the apparatus. Another object of this invention is to provide control means to shift a portion of an apparatus from one position to a second position, and upon attainment of this position to actuate another portion of the apparatus.

It is a still further object of this invention to provide in an agricultural implement hydraulic means to raise and lower the implement relative to the ground and means responsive to the hydraulic means to actuate a drivable element upon the attainment of the lower position of the implement. More specifically, it is a feature of the present invention to provide a rotary rod weeder attachment which is provided with a fluid motor to drive the rotary weeder rod, said fluid motor being responsive to a hydraulic motor or cylinder used to raise and lower the tool carrier to which the rod weeder is attached. The fluid motor that drives the weeder rod is in a parallel fluid circuit with the hydraulic motor circuit that is used to raise and lower the tool carrier, and when the tool carrier is being lowered the fluid motor offers a greater resistance to fluid flow than the hydraulic motor which is used to raise and lower the tool carrier, therefore virtually no fluid will flow through the drive motor until substantially after the hydraulic motor or cylinder has lowered the rod weeder.

Figure 1:
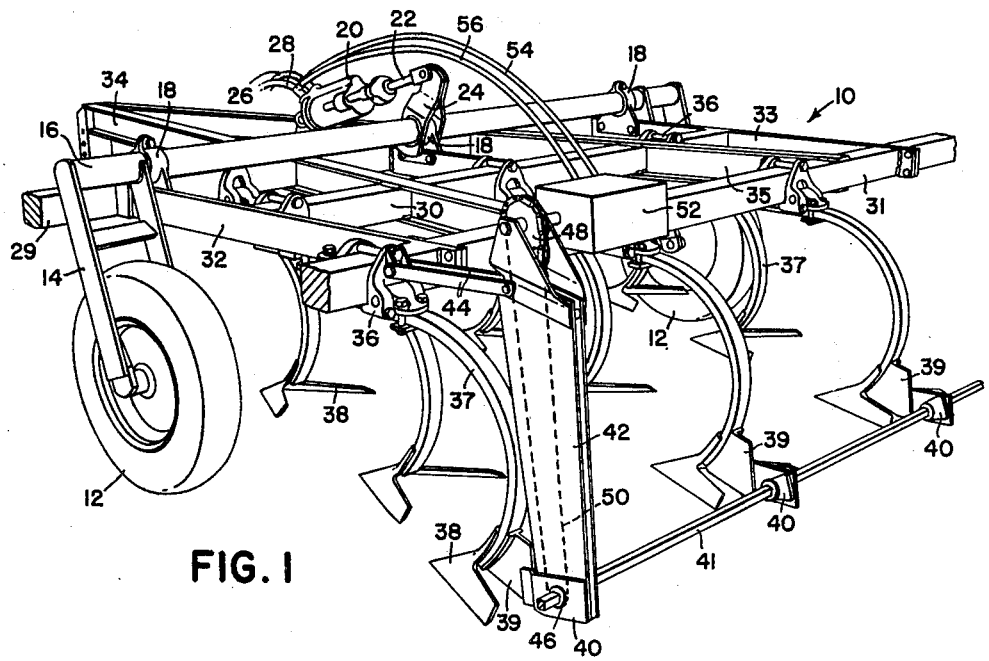
Figure 2:
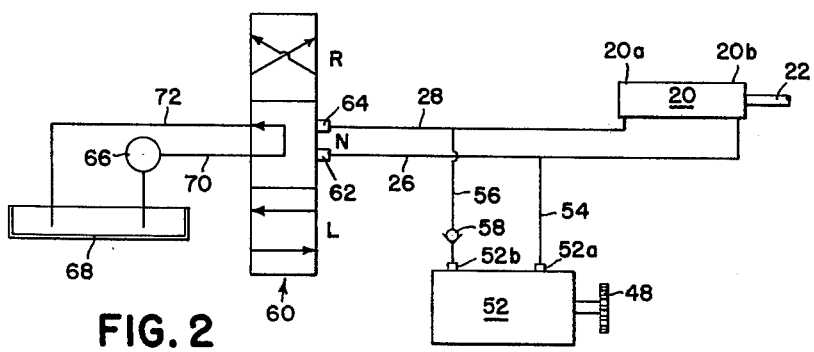

These and other objects and advantages of the present invention will be apparent to those skilled in the art after a consideration of the following detailed description, taken in conjunction with the accompanying drawings, in which:

FIG. 1 is a perspective view of a device incorporating the principles of the present invention, and FIG. 2 is a diagrammatic illustration of the fluid control system.

Referring first to FIG. 1, it will be seen that the apparatus in which the principles of the present invention have been incorporated is somewhat similar to the agricultural implement shown in U.S. Patent 2,892,504, issued June 30, 1959, to Harry L. Mowbray, and comprises a main frame generally indicated at 10 which is normally supported on a pair of ground wheels 12 which are journaled on arms 14 carried by rock shaft 16. The rock shaft is rotatably mounted on bearings 18 which are secured to the main frame. Attached at one end to the forward portion of the main frame 10 is a motor comprising a double acting hydraulic cylinder 20 having opposite ends 20a, 20b, and a piston rod 22 which is in turn connected to an upstanding flange 24 that is rigidly secured to the rock shaft 16. The double acting hydraulic cylinder 20 is connected through a pair of fluid lines 26 and 28 to the hydraulic system of a tractor.

The main frame 10 includes transversely extending front, intermediate, and rear bars 29, 30, and 31 respectively. These bars are interconnected by longitudinally extending side rails 32, 33, and also by the longitudinally extending draft rails 34, 35. Mounted on the bars 29, 30, 31 of the main frame 10 are a plurality of mounting brackets 36 which carry standards 37 which in turn are provided with earth working tools 38 mounted on the lower forward portion of the standards. Mounted on the lower rear portion of those standards 37 which are carried by the rear bar 31 are support brackets 39 which in turn carry rod supports 40. A rotary weeder rod 41 is rotatably received in the rod supports 40. A rod weeder boot 42 is secured at its lower end to the rod support 40 carried by one of the standards and the boot is also supported at its upper end by links 44 which are in turn connected to the associated mounting bracket 36 used to mount the standard to the rear bar. The rod weeder boot carries a lower gear 46 which is fixed to the rotary weeder rod 41 and the upper portion of the boot carries an upper gear 48 which drives the lower gear through drive chain 50.

Heretofore it has been the practice to drive the rotary weeder rod either through means connected with the ground wheels (as shown in the Mowbray patent) or by means connected to the power take off shaft of the tractor (as shown in Pat. No. 2,596,270 to Miller et al.). However in the present invention the weeder rod is driven through a fluid motor 52 which drives the rotary weeder rod 41 through gear 48, drive chain 50 and gear 46. The fluid motor 52 has input and discharge sides 52a, 52b, respectively (FIG. 2), and is connected to the hydraulic system of a tractor through a pair of fluid conduits 54 and 56, conduit 54 being interconnected with line 26 which is in turn connected to port 62 of the tractor control valve 60, and conduit 56 being interconnected with line 28, which is in turn connected to port 64. One of the conduits 54, 56 is provided with a check valve 58. As shown in FIG. 2, the tractor hydraulic system includes a reservoir 68, a pump 66, and a control valve 60.

As can be seen from an inspection of FIG. 2, the first fluid circuit that passes by lines 26 and 28 through the double acting hydraulic cylinder 20 is in parallel with the second fluid circuit that passes by lines 54 and 56 through the fluid motor 52. By employing this parallel fluid circuitry it is possible to make the fluid motor 52 run or stop according to the position of the tool carrier, the position of the tool carrier being controlled by the cylinder 20.

The operation of applicant's device is as follows:

When the device is in its transport or raised position, the cylinder 20 is in its extended position and the tractor control valve 60 in its neutral position (N). To lower the tool carrier and its associated working parts it is necessary to shift the tractor control valve 60 to its lower position (L). This causes fluid under pressure to be sent through line 70, port 62 and line 26. While line 26 is connected both directly to the double acting hydraulic cylinder 20 and to the fluid motor 52 through conduit 54, virtually no fluid will flow through the motor 52 until after the cylinder 20 is fully retracted. The reason for this is that the resistance to fluid flow through conduits 54, 56, fluid motor 52, and check valve 58 is greater than that resistance offered by the cylinder 20 when the implement is being lowered. Or stated in another way, it takes more power to force fluid through the fluid motor 52 than through the cylinder 20, and therefore virtually no fluid will flow through the motor 52 as long as there is a parallel path offering virtually no resistance to fluid flow. Therefore the cylinder 20 is initially retracted with the exhausted fluid returning to the reservoir through line 28. The retraction of cylinder 20 causes the rock shaft 16 to rotate, thereby lowering the main frame with respect to the ground wheels 12. When the main frame is fully lowered and further retraction of the cylinder 20 is no longer possible, the resistance in the cylinder 20 to the flow of fluid then becomes greater than the resistance in the parallel second fluid circuit 54, 52, 56, 58 and then the fluid will flow through the motor 52 and operate the same. Fluid from the motor 52 is exhausted into conduit 56 and then back to reservoir 68 through line 28, port 64, and line 72.

When it is desired to raise the implement relative to the ground, the control valve 60 is shifted from its lower position (L) to its raise position (R). This will then send fluid under pressure through line 28 which will extend the lift means or cylinder 20, the exhausted fluid returns to the reservoir 68 through line 26. No fluid will flow through the motor 52 when the control valve 60 is in its raise position since the check valve 58 permits the fluid to flow in only one direction. Thus it can be seen that the weeder rod 41 will not rotate until the frame has been lowered relative to the ground and, upon shifting the control valve to its raise position to raise the frame, rotation of the rod 41 ceases.

While only one form of the invention has been shown, it should be recognized that other forms and variations may occur to those skilled in the art without their departing basically from the broad general principles disclosed herein. Therefore it should be understood that the present description and disclosure was given for the purposes of clearly and concisely illustrating the principles of the invention and there is no intention to so limit or narrow the invention beyond the broad general scope as set forth in the appended claims.

What is claimed is:

1. In an implement having a working part shiftable between first and second positions, a drivable element, and fluid lift means including a double acting fluid cylinder connected to and for shifting said part between first and second positions, said double acting fluid cylinder having opposite ends alternately fluid-pressure-chargeable and dischargeable, the improvement comprising: a rotary fluid motor connected to and for driving the element and having input and discharge sides; a pair of fluid conduits respectively connecting said input and discharge sides to those ends of the double-acting fluid cylinder that are respectively charged and discharged incident to shifting of the working part from the first position to the second position; and means including a one-way valve in one of said conduits operative to close against discharge-to-input flow in the rotary fluid motor and to open to input-to-discharge flow in said rotary fluid motor, the resistance to fluid flow in the rotary fluid motor normally being greater than the resistance to the fluid flow in the double-acting fluid cylinder when the working part is being shifted between the first and second positions.

2. In an agricultural implement having a working part shiftable between raised and lowered positions and a drivable element changeable between stop and run conditions, a fluid system comprising: a double-acting fluid cylinder connected to and for raising and lowering the working part and including opposite ends to and from which fluid is supplied and returned; a rotary fluid motor connected to and for driving said element and including input and discharge sides, the resistance to fluid flow in the rotary fluid motor normally being greater than the resistance to fluid flow in the double acting fluid cylinder when the working part is in its raised position; a fluid pressure source including a pump, a reservoir and means having fluid ports alternately serviceable as supply and return ports, said means including a control valve selectively changeable to raise and lower positions at opposite sides of a neutral position for controlling said ports, first and second fluid lines connected respectively between said ports and opposite ends of the double-acting motor and serviceable as supply and return lines with the control valve in its lower position and as return and supply lines with the control valve in its raised position; first and second fluid conduits connected respectively between the first and second lines and the input and discharge sides of the fluid motor; and means including a one-way valve in one of said conduits and having a closed position preventing fluid flow through the rotary fluid motor from the second line and an open position permitting fluid flow through the rotary fluid motor from the first line.

3. In an agricultural implement comprising a frame, said frame being adapted to be raised and lowered relative to the ground and having a rotary element adapted to rotate in the lowered position and changeable to a stop position when the frame is in its raised position, ground wheels carrying said frame, and first fluid circuit means adapted to shift the frame relative to the ground wheels, said means including a double acting fluid cylinder connected to and for raising and lowering the frame relative to the wheels, said double acting fluid cylinder having opposite ends alternately fluid-pressure-chargeable and dischargeable, the improvement comprising: a second fluid circuit operatively connected to and for driving the rotary element and having input and discharge sides connected to those ends of the double-acting fluid cylinder that are respectively charged and discharged incident to lowering the frame relative to the ground wheels, and means including a one-way valve in said second circuit operative to close against discharge-to-input flow in the second circuit and to open to input-to-discharge flow in said second circuit, the second fluid circuit including means opposing input-to-discharge flow and yieldable in response to pressure rise in the charged end of the double-acting motor incident to attainment by the frame of its lowered position.

4. In an agricultural implement having a frame, a rock shaft mounted on the frame, ground wheels carried by said rock shaft, a weeder rod carried by said frame, and means adapted to rotate the rockshaft to lower the frame relative to the ground whereby the weeder rod engages the ground, said means including a double acting fluid cylinder having opposite ends which are connectible through a pair of fluid lines alternately to a source of fluid pressure and a fluid reservoir, the improvement comprising: fluid motor means adapted to rotate said weeder rod, said fluid motor having input and discharge sides, and a pair of fluid conduits connecting the input and discharge sides of the fluid motor respectively to the fluid pressure source and the fluid reservoir in parallel respectively with the pair of fluid lines, said fluid motor resisting fluid flow until substantially after the double acting fluid cylinder has lowered the weeder rod.

5. In an agricultural implement having a frame, a rock shaft mounted on the frame, ground wheels carried by said rockshaft, a weeder rod carried by said frame, and means adapted to rotate the rockshaft to lower the frame relative to the ground whereby the weeder rod engages the ground, said means including a double acting fluid cylinder having opposite ends which are connectible through a pair of fluid lines alternately to a source of fluid pressure and a fluid reservoir, the improvement comprising: fluid motor means connected to and for driving the weeder rod and having input and discharge sides; a pair of fluid conduits respectively connecting said input and discharge sides to those ends of the double-acting fluid cylinder that are alternately connectible to a source of fluid pressure and a fluid reservoir, and means including a one-way valve in one of said conduits operative to close against discharge-to-input flow in the fluid motor means and to open to input-to-discharge flow in said fluid motor means, said fluid motor means resisting fluid flow until substantially after the double acting fluid cylinder has lowered the weeder rod.

6. In an agricultural implement having a frame shiftable between a raised position and a lowered position and a weeder rod rotatably carried by said frame, a fluid system comprising: a first fluid circuit including fluid cylinder means adapted to shift said frame from the raised position to the lowered position, a second fluid circuit operatively connected to and for driving said weeder rod, means to introduce fluid pressure substantially simultaneously into both the first fluid circuit and the second fluid circuit, and means in the second fluid circuit to substantially delay fluid flow through the second circuit until substantially after said fluid cylinder has shifted the frame from its raised position to its lowered position.

7. In an agricultural implement having a frame shiftable between a raised position and a lowered position and a weeder rod rotatably carried by said frame, a first fluid circuit including a double acting fluid cylinder connected to and for shifting said frame between raised and lowered positions, said double acting fluid cylinder having opposite ends which are alternately connectible through a pair of fluid lines to a source of fluid pressure in a fluid reservoir, a second fluid circuit operatively connected to and for driving said weeder rod, said second fluid circuit having input and discharge conduits connected to the fluid pressure source and the fluid reservoir in parallel respectively with the pair of fluid lines, and means in the second fluid circuit to resist fluid flow therethrough until substantially after the double acting fluid cylinder has shifted the frame from its raised position to its lowered position.

References Cited in the file of this patent

UNITED STATES PATENTS

| | | |
|---|---|---|
| 2,001,620 | Levy | May 14, 1935 |
| 2,593,039 | Livers et al. | Apr. 15, 1952 |
| 2,792,065 | Cole | May 14, 1957 |
| 2,865,175 | Gondek | Dec. 23, 1958 |
| 2,912,826 | Tan | Nov. 17, 1959 |